United States Patent [19]

Moll

[11] 3,982,787
[45] Sept. 28, 1976

[54] SEAT ARRANGEMENT FOR A PASSENGER CAR
[75] Inventor: Hans Moll, Augsburg, Germany
[73] Assignee: Maschinenfabrik Augsburg-Nurnberg AG, Munich, Germany
[22] Filed: Jan. 6, 1975
[21] Appl. No.: 538,949

[30] Foreign Application Priority Data
Jan. 11, 1974   Germany............................ 2401241
Jan. 15, 1974   Germany............................ 2401741

[52] U.S. Cl. ............................... 297/317; 296/65 R
[51] Int. Cl.² ........................................... A47C 1/02
[58] Field of Search .......... 297/317, 322, 343, 318, 297/316, 319, 243; 296/65 R, 63, 64, 65 A, 66, 67, 68, 69

[56] References Cited
UNITED STATES PATENTS
| 837,050 | 11/1906 | Garnett | 297/343 |
| 1,964,519 | 6/1934 | Knudsen | 297/317 X |
| 1,984,281 | 12/1934 | Poggendorf | 297/317 |
| 2,479,175 | 8/1949 | McArthur | 297/318 |
| 2,953,103 | 9/1960 | Bohannon | 297/318 |
| 2,981,314 | 4/1961 | Eklof | 297/343 |
| 3,401,979 | 9/1968 | Putsch | 297/366 X |

FOREIGN PATENTS OR APPLICATIONS
| 1,405,227 | 12/1968 | Germany | 296/65 R |
| 16,503 | 4/1910 | United Kingdom | 297/232 |

Primary Examiner—James T. McCall
Attorney, Agent, or Firm—W. G. Fasse; W. W. Roberts

[57] ABSTRACT

The present passenger car has front seats and rear seats and includes means for adjusting both seats back and forth along the longitudinal axis of the passenger vehicle. For this purpose the rear seat is guided on tracks, preferably tracks which have a portion rising in the forward direction. The rear back rest is hinged at its lower edge or end to the rear edge of the rear seat proper. The top edge of the rear back seat is guided in substantially vertical guide rails, whereby it is possible to tilt the back rest relative to the horizontal in the manner of a reclining chair simultaneously with the longitudinal adjustment of the rear seat or seats.

4 Claims, 3 Drawing Figures

SEAT ARRANGEMENT FOR A PASSENGER CAR

BACKGROUND OF THE INVENTION

The present invention relates to a seat arrangement for a passenger car, more specifically to a multi-purpose passenger car, for example, a station wagon type of car in which the trunk space or loading space forms part of the passenger space, whereby two seat rows are arranged one behind the other.

The requirement that passenger vehicles shall be versatile and economical has received more and more attention in recent times and has become a rather important basis for the designing of passenger cars. As a result, multi-purpose construction features have been employed heretofore in passenger cars. For example, a rear seat construction is known in which the back rest proper is foldable in the forward direction as viewed in the longitudinal axis of the vehicle, whereby to increase the loading space. It is also known to fold the back rest of the rear seats in a forward direction, while simultaneously tilting the entire rear seat forwardly, whereby a relatively large loading and trunk space may be achieved. Such vehicles are usually provided with a rear door so that a passenger vehicle may be transformed with a few modifying operations into a utility vehicle, such as a station wagon.

It is also known to divide the rear back rest into two individual back rests, which may be tilted independently of each other in the forward direction so that one portion of the vehicle, for example, one half may be used as a loading space of increased length, whereas the other portion with the back rest in the normal position may be used for transporting, for example, a third passenger. The dividing of the back rest into two portions has taken into account that a continuous seating bench does not provide sufficient lateral support for the passenger, especially at higher speeds and particularly when negotiating a curve at higher speeds as frequently happens in a passenger car. This development has also taken into account that quite frequently the entire width of a passenger car is not needed for the transporting of goods, whereas it is often necessary to have space on the back seat for a further passenger.

The just described types of prior art passenger car modifications increases the versatility of passenger cars described above. However, such modification as well as all other prior art passenger car modifications have the substantial disadvantage that the passengers on the rear seat are not accommodated as comfortably as is the case for the driver and the passenger sitting on the front seat. This is so, especially because the leg space between the rear seats and the back rests of the front seats is usually relatively small, especially when the driver and the other passenger on the front seat take full advantage of the normally provided possibility of adjusting the front seat or seats in the longitudinal direction of the vehicle axis by moving the front seat as far back as possible in order to provide as much leg room as possible for the front seats.

Another factor which accounts for the fact that the rear seats are relatively less comfortable than the front seats is seen in that the rear back rest is not adjustable in its position relative to the horizontal. Such a modification would substantially increase the costs, especially of prior art station wagon type vehicles which, as described above, are equipped with a back rest for increasing the loading space by tilting the back rest forward in these so called multi-purpose vehicles.

It is further known in connection with an ambulance vehicle to provide a total of three seating rows, one arranged behind the other, whereby the seats of the middle row are adjustable individually or in common in the longitudinal direction of the vehicle, whereby the leg room for the middle row of seats or for the last row of seats may be increased. This seating arrangement is disclosed in German Utility Model Pat. No. 1,786,696. However, in this ambulance there is a separate wall located immediately behind the back rest of the front seat row, whereby the space inside the vehicle is separated into a driver cabin and into a transport space for the transporting of sick or injured persons. Accordingly, the second row of seats actually is comparable with the row of seats in the driver cabin, because the leg room for the first row in the loading space of the ambulance is determined by the separation wall and the leg room of the third row of seats is adjustable only by the adjustment of the middle row, which is just the same as in conventional passenger cars, where the leg room of the rear seat is determined by the adjustment of the front seats. Thus, the just mentioned German Utility Model does not give any hint with regard to the desirability of the adjustment of the rear seats independently of the adjustment of the front seats.

OBJECTS OF THE INVENTION

In view of the foregoing, it is the aim of the invention to achieve the following objects singly or in combination:

to modify conventional passenger vehicles, especially of the multi-purpose type, in such a manner that the rear row of seats will provide the same comfort to the passengers as is provided by the front seats for the driver and a passenger sitting on the other front seat;

to make it more attractive than heretofore to use a passenger car for the transport of more than one or two persons;

to construct at least one rear seat, preferably, all rear seats so that they may be utilized in the manner of a reclining chair;

to arrange the rear seats so that they may be adjustable to predetermined positions back and forth along the longitudinal axis of the vehicle;

to arrange the rear seat proper and its respective rear back rest in such a manner that a forward adjustment of the rear seat proper results in a more inclined position of the back rest and vice versa;

to provide means for varying the inclination of the seating surface of the back seat proper as a function of its longitudinal position; and to provide foot rest means arranged so as to extend the rear seat proper preferably to a level which is somewhat higher than the seating level of the rear seat proper.

SUMMARY OF THE INVENTION

According to the invention there is provided a seat arrangement for a passenger car having front seat means and rear seat means as well as first means for adjusting the position of the front seat means relative to the length of the car and further adjustment means operatively associated with the rear seat means for also adjusting the position of the rear seat means relative to the length of the car independently of the front seats.

It is an important advantage of the invention that with the adjustability of the rear seats independently of the front seats the passengers on the rear seats also may select their leg room by individually adjusting the rear seat or seats. Due to the independent adjustment of the front and rear seats, it is now possible to provide a wide range of adjustments for the leg room in the front of the car, as well as in the rear of the car, especially when one adjustment takes the other adjustment into account to provide the best possible comfort for both the front seat passengers and the rear seat passengers. A further advantage is seen in that the rear seats may now be pushed far forward close to the back of the front seats to thereby provide a longer storage and loading space behind the rear seats, if desired.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
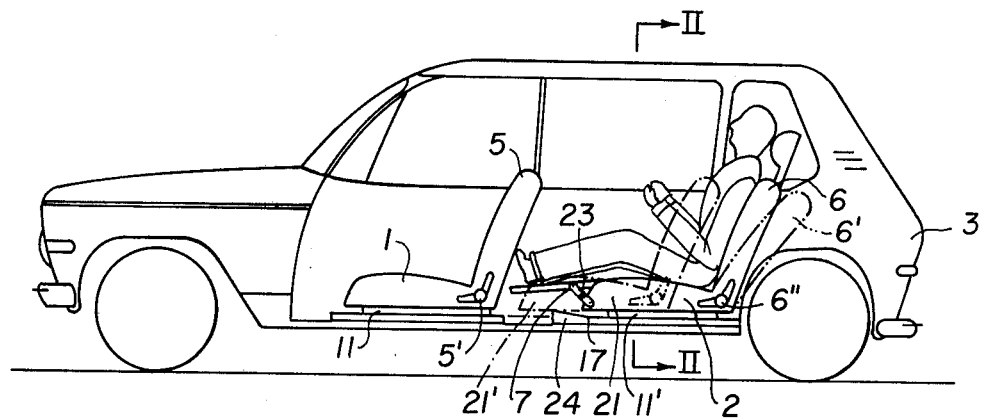
FIG. 1 is a side view into the interior of a passenger car according to the invention with parts broken away to facilitate the illustration of the seating arrangement.

FIG. 1 illustrates a multi-purpose passenger car with a front seat row 1 and a rear seat row 2, as well as a loading space 3 behind the rear seat row 2. The loading space 3 forms part of the general passenger space. As may be seen from FIG. 2, the row of rear seats comprises, for example, two separate, individual seats 21 arranged next to each other. Incidentally, the front row is also provided with two separatly adjustable seats as is conventional. The front seats 1 have back rests 5 and are adjustable back and forth in the direction of the longitudinal axis of the car on rails 11 as is also conventional. Locking means well known are employed to arrest the front seat in any one of a number of adjustable positions.

The back rest 5 of the front seat 1 is hinged to the seat proper by tilting pivot means 5, which permit the adjustment of the back rest 5 in a number of angular positions. The rear seats 2 have individual back rests 6, which are pivoted to the rear seats by pivot means 6" for pivoting into different angular positions 6' as indicated by dash-dotted lines.

Figure 2:
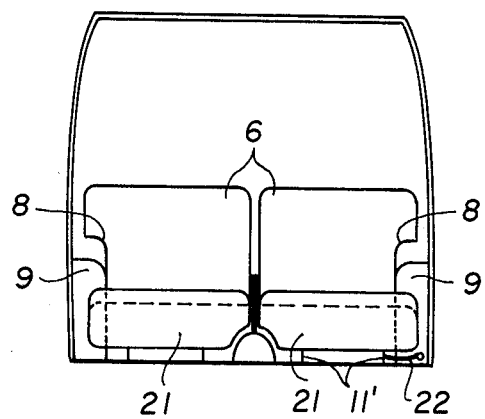
FIG. 2 is a sectional view along section lines II—II in FIG. 1.

As best seen in FIG. 2, the row 2 of rear seats comprises two individual seats 21, which are provided with a foot or leg rest 7, which may be pulled out from the rear seat proper when the latter is in the rearmost position. Pivotable lever means 23 permit the adjustment of the foot rest 7 to an elevated position, for example, as high as the seating surface of the rear seat 21 or preferably even somewhat higher. This feature of the invention has the advantage that the passenger on the rear seat may take up a resting position as shown in FIG. 1. The adjustability of the angular position of the back rest of the rear seats, especially in combination with the extendable and raisable foot rest has the advantage that a passenger on the back seat may fully relax so that a driver exchange will not require any extended pause.

As is shown in FIG. 1, the back rests 6 of the rear seats 21 may even be tilted into a different angular position when the back seats 21 are in their rearmost end position. Such tilted position 6' of the back rest 6 is shown in FIG. 1, whereby the back rests 6 are provided with cut-outs 8, as best seen in FIG. 2 so that these back rests 6 may clear the wheel casings 9 of the rear wheels when the back rests 6 are tilted into the position 6'. The most forward position of the rear seats 21 is indicated with a dash-dotted line at 21'. In this position 21' the foot rest 7 will be retracted and the pivot levers 23 will be folded inwardly, so as not to interfere with the positioning of the rear seats in the most forward position.

The rear seats 21 are movable back and forth on rails 11' the forward end of which is provided with a rising cam surface 24. A locking lever 22 shown in FIG. 2 is provided to lock the rear seats in several selected positions. The cam surface 24 merges at 17 into a horizontal portion of the tracks 11' so that a shifting of the rear seats 21 in the forward direction beyond the merging point 17 will lift the front edge of the seats 21 while the rear edge of the seats 21 is still riding along a horizontal path of the tracks 11'. In this manner the angular position of the seating surface of the rear seats relative to the horizontal may also be adjusted. Similarly, a raising of the rear end or rear edge of the rear seats 21 may be accomplished by keeping the forward end of the rails 11' horizontal and providing the rear ends of these rails with a rising cam surface. As mentioned, the lever 22 may be employed in combination with known locking means for securing the seats 21 along the rails 11'.

Figure 3:
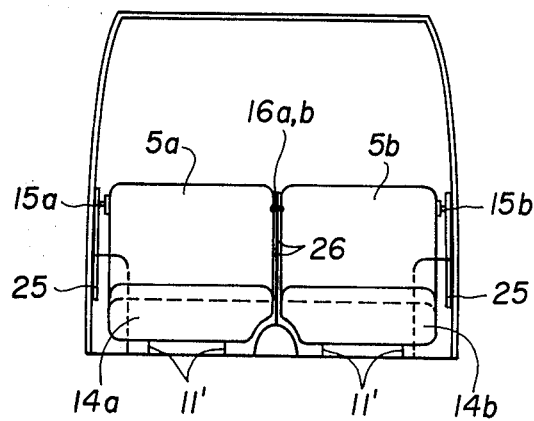
FIG. 3 is a view similar to that of FIG. 2, however, illustrating a modified embodiment of the invention, wherein the rear back rests are guided along substantially vertically extending guide rails.

FIG. 3 illustrates a modification for the angular tilting of the back rests of the rear seats. Further, in the embodiment of FIG. 3, the rear seat row 2 comprises two individual seats 14a and 14b, which are independent of each other and which each have individual rear back rests 5a and 5b, the lower edge of which may also be pivoted to the rear edge or rear end of the respective individual seat 14a, 14b. The upper edge of each back rest 5a, 5b is provided adjacent the corners thereof with guide cams 15a and 15b as well as 16a and 16b which run in respective guide rails 25 and 26. These guide rails 25, 26 extend substantially vertically and are secured to the body of the vehicle. The guide cams 15a, 15b, 16a and 16b ride up and down in slots of the guide rails 25, 26, whereby the angular position of the back rests 5a, 5b may be automatically changed as a result of a forward or backward shifting of the individual seats 14a, 14b along the rails 11'.

The just described guiding of the back rests 5a, 5b which are hinged or journaled to the rear edges of the respective rear seats 14a, 14b has the advantage that the longitudinal position of the seating means proper and the angular position of the back rest may be selected simultaneously and as a function of each other, whereby very simple and inexpensive means are employed and the locking may be accomplished by a single locking means such as the lever 22, whereby the adjustment is extremely simple. Incidentally, the simultaneous adjustment of the inclination of the back rest with the horizontal positioning of the rear seat proper may be further combined with the raising of the front edge of the rear seat 21, as has been described with reference to FIG. 1 by riding the front end of the rear seat up along an incline 24 as described. Such a combination further increases the comfort for the passengers on the rear seats. In addition the raising of the front edge of the rear seat has the advantage that the passenger has a better support in the resting position when the back rest is substantially tilted. Such better support is also advantageous when the brakes should have to be applied rapidly in an emergency, because the entire seating area of the person will be supported.

The simultaneous coordination of three adjustment elements to each other; namely, the angular position of the back rest, the angular position of the seating area proper, and the longitudinal position of the seating area proper has been achieved by surprisingly simple means, because the raising of the front edge of the rear seat by means of the cam surface 24 is rather simple, and because the guiding of the upper edge corners of the back rests in substantially vertical rails is also accomplished by very simple elements.

The further combination of a foot or leg rest 7 with the adjustability described above for the back seats enables a passenger to change the back seat into a recliner type chair, in which the passenger may take up an almost lying down position.

The further feature that the rear seat means comprise two individual seats 14a and 14b, which may be individually adjusted, has the advantage that the variation possibilities are substatially increased, whereby an adjustment to the individual taste of any particular passenger is possible, especially since the adjustability of the front seats combined with the adjustability of the rear seats also greatly increases the number of possible variations. Thus, where, for example, the front seats are in their most forward position, the rear seats may provide a substantial leg room even in a forward position and thus substantial leg room with an inclined back rest is provided simultaneously for the comfort of the passengers riding on the rear seat. In addition, the individual seats may provide a substantial loading space behind the back rest of the rear seats.

Although the invention has been described with reference to specific example embodiments it is to be understood, that it is intended to cover all modifications and equivalents within the scope of the appended claims.

What is claimed is:

1. A seat arrangement for a multi-purpose passenger car comprising front seat means and rear seat means, first adjusting means connected to said front seat means for adjusting the position of said front seat means relative to the length of the car, second adjusting means connected to said rear seat means for adjusting the position of the rear seat means also relative to the length of the car but independently of any adjustment of the front seat means, said rear seat means comprising back rest means having upper corners and a rear seat proper having forward and rear edges, hinge means connecting said back rest means to the rear edge of the back seat proper, whereby said back rest means is angularly adjustable relative to the vertical, substantially vertically extending cam track means located adjacent to said back rest means, connecting means at the upper corners of said back rest means arranged to ride along said vertically extending cam track means, horizontal cam track means for said rear seat proper, said horizontal cam track means having a forward section which slopes down rearwardly relative to the length of the car and a rearward section extending substantially horizontally and merging into said forward cam track section, said substantially horizontally extending rearward section having a length sufficient to permit a horizontal adjustment of the rear seat proper when the latter is in its rearward positions, said forward edge of said rear seat proper riding on said rearwardly sloping forward section of said horizontal cam track when said rear seat proper is moved forward so that said rear edge of said rear seat proper is riding on said horizontal rearward section of the horizontal cam track, whereby said rear seat proper is automatically adjustable in its angular position relative to the horizontal in response to the longitudinal adjustment of said rear seat proper in its forward adjustment.

2. The seat arrangement according to claim 1, wherein said rearwardly sloping forward section of said horizontal cam track automatically lifts said forward edge of said rear seat proper to its highest level as the rear seat proper is moved to its most forward position, said rearwardly sloping forward section of said horizontal cam track also lowering the forward edge of said rear seat proper to its lowest level as the rear seat proper is moved to its rearmost position.

3. The seat arrangement according to claim 1, wherein said front seat means and said rear seat means each comprise individual seats which are independent of each other, each individual seat including its own back rest which is independent of any other back rest.

4. The seat arrangement according to claim 1, wherein said back rest means has cut-outs for clearing wheel casings when said rear back rest means are inclined rearwardly.

* * * * *

UNITED STATES PATENT OFFICE
CERTIFICATE OF CORRECTION

Patent No. 3,982,787      Dated September 28, 1976

Inventor(s) Hans Moll

It is certified that error appears in the above-identified patent and that said Letters Patent are hereby corrected as shown below:

In the Abstract:

line 10, replace "rest" with --seat--.

Signed and Sealed this

Thirtieth Day of November 1976

[SEAL]

Attest:

RUTH C. MASON
*Attesting Officer*

C. MARSHALL DANN
*Commissioner of Patents and Trademarks*